(12) United States Patent
Reithmeier et al.

(10) Patent No.: US 12,043,125 B2
(45) Date of Patent: Jul. 23, 2024

(54) BATTERY HOUSING AND ITS USE IN ELECTRIC VEHICLES

(71) Applicant: Covestro Intellectual Property GmbH & Co. KG, Leverkusen (DE)

(72) Inventors: Richard Reithmeier, Cologne (DE); Benedikt Kilian, Düsseldorf (DE); Claudio Pauler, Leverkusen (DE); Dirk Bruening, Leverkusen (DE); Harald Rasselnberg, Dormagen (DE); Andreas Hoffmann, Pulheim (DE)

(73) Assignee: Covestro Intellectual Property GmbH & Co. KG, Leverkusen (DE)

( * ) Notice: Subject to any disclaimer, the term of this patent is extended or adjusted under 35 U.S.C. 154(b) by 330 days.

(21) Appl. No.: 17/437,461

(22) PCT Filed: Mar. 23, 2020

(86) PCT No.: PCT/EP2020/057998
§ 371 (c)(1),
(2) Date: Sep. 9, 2021

(87) PCT Pub. No.: WO2020/200885
PCT Pub. Date: Oct. 8, 2020

(65) Prior Publication Data
US 2022/0169124 A1  Jun. 2, 2022

(30) Foreign Application Priority Data
Mar. 29, 2019 (EP) ..................... 19166070

(51) Int. Cl.
*B60L 50/64* (2019.01)
*B60K 1/04* (2019.01)
(Continued)

(52) U.S. Cl.
CPC ............... *B60L 50/64* (2019.02); *B60K 1/04* (2013.01); *H01M 50/227* (2021.01);
(Continued)

(58) Field of Classification Search
CPC .......... B60L 50/64; B60K 1/04; H01M 50/24; H01M 50/249; H01M 50/227; H01M 50/289; H01M 50/242
(Continued)

(56) References Cited

U.S. PATENT DOCUMENTS

| 7,931,105 B2 | 4/2011 | Sato et al. |
| 8,672,354 B2 | 3/2014 | Kim et al. |

(Continued)

FOREIGN PATENT DOCUMENTS

| DE | 102012224041 A1 | 6/2013 |
| DE | 102017217155 A1 | 3/2019 |
| EP | 3428993 A1 | 1/2019 |

OTHER PUBLICATIONS

Haberkorn, Eduard, Methodical and efficient development of battery housing systems ("Methodisches und effizientes Entwickeln von Batteriegehäusesystemen"), Automotive Center Südwestfalen GmbH, presented at the conference "Batteriesysteme im Karosseriebau 2018" on Jun. 12, 2018 in Bad Nauheim.
(Continued)

*Primary Examiner* — Hau V Phan
(74) *Attorney, Agent, or Firm* — Donald R. Palladino

(57) ABSTRACT

The present invention relates to a battery housing and to its use in electric vehicles. The battery housing includes at least a cover and a floor which are joined to one another and the cover is joined to the vehicle body or a part of the vehicle body forms the cover. The floor faces away from the vehicle body, is obtained by pultrusion, and is made of thermosetting plastic obtainable from a reactive resin mixture and
(Continued)

reinforced with endless fibers, wherein the fibers run transversely to the direction of travel of the vehicle.

12 Claims, 1 Drawing Sheet

(51) Int. Cl.
    *H01M 50/227* (2021.01)
    *H01M 50/233* (2021.01)
    *H01M 50/238* (2021.01)
    *H01M 50/24* (2021.01)
    *H01M 50/242* (2021.01)
    *H01M 50/244* (2021.01)
    *H01M 50/249* (2021.01)
    *H01M 50/271* (2021.01)
    *H01M 50/289* (2021.01)

(52) U.S. Cl.
    CPC ....... *H01M 50/233* (2021.01); *H01M 50/238* (2021.01); *H01M 50/24* (2021.01); *H01M 50/242* (2021.01); *H01M 50/244* (2021.01); *H01M 50/249* (2021.01); *H01M 50/271* (2021.01); *H01M 50/289* (2021.01); *B60K 2001/0438* (2013.01)

(58) Field of Classification Search
    USPC ........................................................ 180/68.5
    See application file for complete search history.

(56) References Cited

U.S. PATENT DOCUMENTS

| | | | |
|---|---|---|---|
| 9,065,111 B2 * | 6/2015 | Kim | H01M 50/271 |
| 9,070,926 B2 * | 6/2015 | Seong | H01M 50/264 |
| 9,653,712 B2 * | 5/2017 | Seong | B60L 58/26 |
| 10,865,283 B2 | 12/2020 | Schornstein | |
| 2004/0106726 A1 | 6/2004 | Joshi et al. | |
| 2012/0103714 A1 | 5/2012 | Choi et al. | |
| 2013/0252059 A1 | 9/2013 | Choi et al. | |
| 2016/0251807 A1 | 9/2016 | Hawkins et al. | |
| 2018/0337374 A1 * | 11/2018 | Matecki | B60K 1/04 |
| 2018/0337377 A1 * | 11/2018 | Stephens | H01M 50/224 |
| 2019/0148688 A1 * | 5/2019 | Kellner | H01M 50/224 |
| | | | 429/185 |

OTHER PUBLICATIONS

Guenther, Alexander, Challenges in the development of High Voltage Battery Housings ("Herausforderungen in der Entwicklung von HV-Batteriegehäusen"), Kirchhoff Automotive Deutschland GmbH, presented at the conference "Batteriesysteme im Karosseriebau 2018" on Jun. 12, 2018 in Bad Nauheim.
Ionescu, Mihail, "Chemistry and Technology of Polyols for Polyurethanes", Rapra Technology Limited, Shawbury 2005, p. 31 et seq. (chapt. 3: The General Characteristics of Oligo-Polyols), p. 55 et seq. (chapt. 4: Oligo-Polyols for Elastic Polyurethanes), p. 263 et seq. (chapt. 8: Polyester Polyols for Elastic Polyurethanes), p. 321 et seq. (chapt. 13: Polyether Polyols for Rigid Polyurethane Foams) and p. 419 et seq. (chapt. 16: Polyester Polyols for Rigid Polyurethane Foams).
Kunststoff-Handbuch, vol. VII "Polyurethanes", 3rd edition, Carl Hanser Verlag, Munich / Vienna, 1993, pp. 57-67 and pp. 88-90.
Kunststoff-Handbuch, vol. VII "Polyurethanes", 3rd edition, Carl Hanser Verlag, Munich / Vienna, 1993 on pp. 104-110.
"Kunststoffhandbuch, vol. 7, Polyurethanes", Carl Hanser Verlag, 3rd edition 1993, chapter 3.4.4 and 3.4.6 to 3.4.11.
International Search Report, PCT/EP2020/057998, date of mailing: Jun. 5, 2020, Authorized officer: Monica Duval.

* cited by examiner

BATTERY HOUSING AND ITS USE IN ELECTRIC VEHICLES

CROSS-REFERENCE TO RELATED APPLICATIONS

This application is a national stage application under 35 U.S.C. § 371 of PCT/EP2020/057998, filed Mar. 23, 2020, which claims the benefit of European Application No. 19166070.3, filed Mar. 29, 2019, each of which is incorporated herein by reference.

FIELD

The present invention relates to battery housings and the use thereof in electric vehicles.

BACKGROUND

Electric vehicles with corresponding batteries have long been known. It was recognized early on that these batteries need to be protected, in particular against mechanical influences, for example in the event of an accident or upon impacting obstacles.

The battery housing of a battery for electric vehicles comprises individual battery modules and a control unit and is intended to protect the battery from environmental influences and to increase the efficiency of the battery—as far as possible. In addition, the battery housing should be as light as possible in order to reduce the electricity consumption of the vehicle. The individual parts should be arranged in as a space-saving a manner as possible, and joined to the battery housing. In the event of a vehicle impact, the battery housing should protect the battery modules and the control unit from deformation by absorbing the impact energy from the battery housing or distributing it to the surrounding vehicle structure. Critical impact cases are for example side pole impact and impact on the battery floor. To enhance the efficiency of the battery, the battery housing should have the lowest possible thermal conductivity in order to be able to keep the battery modules in an optimal temperature range in cold ambient temperatures.

EP3428993 A1 describes a battery housing said to protect the battery modules from deformation in the event of an impact using a double-walled housing and spring elements made of steel. Disadvantages here include the additional space required for the spring elements and the increased weight due to the use of springs. In addition, the individual battery modules are movably mounted which impedes connection and routing of the cables. Due to the use of metal, the battery housing also has a high thermal conductivity.

DE102012224041 A1 describes a modular battery pack and a process for producing the modular battery pack. The modularity of the design allows the size of the battery to be easily adapted to the vehicle. It is also possible to flexibly secure the individual battery cells and battery modules in the support structure to compensate for manufacturing tolerances. In one embodiment, additional cooling conduits for heat removal or supply may be attached.

EP1950070 B1 describes a structure for installation of batteries in electric vehicles. A frame component made of metal is embedded in a battery housing made of plastic. There is a particular focus on joining the structure to the rest of the vehicle. Since a large part of the structure, the battery housing, is made of plastic, the essential impact characteristics are assumed by the metal structure or the rest of the vehicle. The frame component results in increased weight.

WO 2012/091404 A2 describes an underbody which accommodates the batteries. This underbody comprises a mounting portion divided into several compartments into which the batteries can be installed. The batteries are protected by the various braces.

DE 102017217155 A1 describes a battery housing made of thermoplastics, wherein not only the housing floor but also the housing wall, housing lid and dividing walls must consist of fiber-reinforced thermoplastic. Thermoplastics generally have poor mechanical properties. The battery housing is preferably produced in a 3D printing process. As is apparent from FIG. 4, different fiber orientations within a sheet element result as a consequence of the process. The achievable fiber contents are relatively low, at least lower than in other processes for producing fiber-reinforced components. A preferred orientation of the reinforcing fibers relative to the direction of travel of the vehicle is not mentioned. Such constructions are not suitable for protecting the battery modules in the event of a side impact.

US 2013252059 A1 describes a battery pack housing assembly consisting of a housing body, a cover and reinforced elements in the side region and/or on the underside of the housing. The housing body is made of plastic reinforced with long fibers or a mixture of long fibers and endless fibers. When using such reinforcement, only low fiber contents can be achieved. In addition, when using long fibers, the orientation of the long fibers cannot be specifically and uniformly adjusted in the production process. Proposed plastics are thermoplastics such as polypropylene, polyamide and others. Extrusion compression molding is proposed as the production process for the housing body. The mechanical characteristics of fiber-reinforced plastic components based on thermoplastics and of components produced by extrusion compression molding are not particularly good. The battery pack housing assembly is made entirely of reinforced plastic. In the event of shock loads, for example side pole impact, the energy acts on the battery housing in a locally concentrated manner. An assembly made merely of reinforced plastic is unsuitable for distributing the energy over a large component area and thus avoiding excessive deformation of the components, and the battery modules are therefore not protected.

The conference paper "Methodisches and effizientes Entwickeln von Batteriegehäusesystemen" by Eduard Haberstroh, Automotive Center Südwestfalen GmbH and the conference paper "Herausforderungen in der Entwicklung von HV-Batteriegehäusen" by Alexander Gunther, Kirchhoff Automotive Deutschland GmbH presented at the conference "Batteriesysteme im Karosseriebau 2018" on Jun. 12, 2018 in Bad Nauheim demonstrated battery housings having a structure produced entirely from metal profiles. The side walls consist of hollow profiles having a plurality of hollow chambers to absorb impact energy. The floor too is made of metal profiles having hollow chambers. The battery housing thus has a high weight. In addition, the housing readily conducts heat outwards and inwards, thus impeding efficient temperature control of the battery modules.

The known designs for protecting batteries in electric vehicles are expensive, technically complicated, often too heavy and sometimes not practicable and the battery modules cannot be temperature-controlled.

SUMMARY

The object of the present invention was therefore that of providing protection for batteries in electric vehicles which is as simple as possible to construct and produce, is universally employable, cost-effective and light and simultaneously passes the customary impact tests.

This object was achieved by a battery housing as claimed hereinbelow. Production and also installation are simple and the housing is universally employable.

BRIEF DESCRIPTION OF THE DRAWINGS

Various features and characteristics of the inventions described in this specification may be better understood by reference to the accompanying figures, in which.

DETAILED DESCRIPTION

Figure 1:
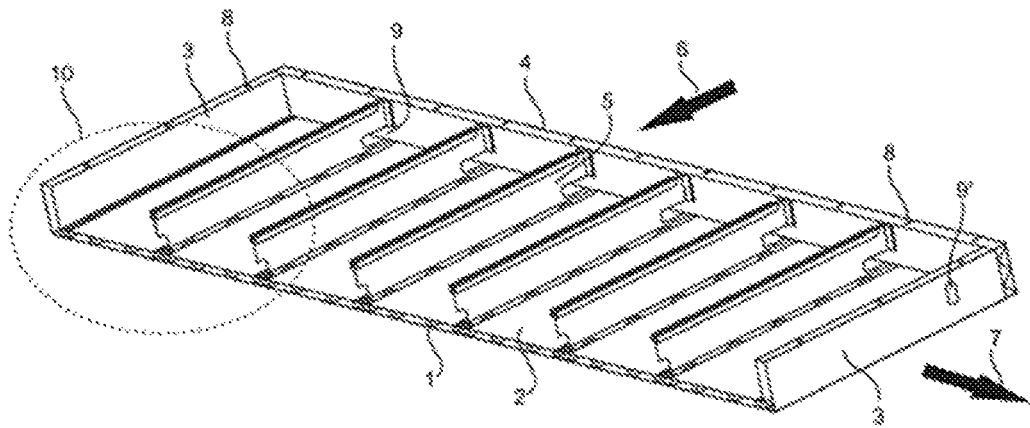
FIG. 1 shows a possible configuration of the drying apparatus according to the invention (1000)

The invention provides a battery housing for electric vehicles, wherein the housing is composed of at least a cover and a floor which are joined to one another and the cover is joined to the vehicle body or a part of the vehicle body forms the cover of the housing, characterized in that the floor faces away from the vehicle body and the floor of the housing is a floor obtained by pultrusion and is made of thermosetting plastic obtainable from a reactive resin mixture and reinforced with endless fibers, wherein the fibers run transversely to the direction of travel of the vehicle.

In one embodiment, the invention provides a battery housing for electric vehicles for protection of the batteries in the event of a side impact to the electric vehicle.

The thermosetting plastic is preferably polyurethane.

The battery housing may be installed as a whole under the vehicle.

In the case of a typical incident force of at least 100 kN through side impact to the electric vehicle, the battery housing according to the invention protects the battery modules present in the battery housing from damage and in a typical side pole impact can absorb an impact energy of at least 24,000 J without damage to the battery modules. The corresponding side impact tests are described in the example section.

The floor of the battery housing is produced by pultrusion from thermosetting plastic reinforced with endless fibers, wherein the reactive resin mixture employed for the plastic is preferably a polyurethane reactive resin mixture. In contrast to other processes, the pultrusion process allows particularly high contents of endless fibers to be achieved. In addition, the pultrusion process achieves exceedingly good orientation of the endless fibers and very good mechanical properties in the pultrusion/profile direction. Pultruded profiles are therefore particularly well suited to absorbing high mechanical loads at simultaneously low weight.

The floor preferably comprises hollow chambers. The hollow chambers save weight and can be used for accommodation of cables, for example. When the floor is produced by pultrusion, the hollow chambers run in the pulling direction of the endless fibers. In a particular embodiment, it is also possible to use the hollow chambers as channels for active temperature control of the battery housing using a temperature control medium.

Particularly preferably when using preferably employed polyurethane as the plastic and glass-based endless fibers, the floor has an axial flexural strength according to DIN EN ISO 14125 of 1100 to 1500 MPa, an axial compression modulus according to DIN EN ISO 14126 of 50 to 60 GPa, an axial interlaminar shear strength according to DIN EN ISO 14130 of 60 to 80 MPa, a shear modulus according to DIN EN ISO 15310 of 3 to 6 GPa, an axial tensile modulus according to DIN EN ISO 527-4 of 45 to 60 GPa, a transverse tensile modulus according to DIN EN ISO 527-4 of 10 to 15 GPa and a thermal conductivity according to DIN EN 993-14 of 0.1 to 0.7 W/m K.

The polyurethane reinforced with glass-based endless fibers preferably has a density according to DIN EN ISO 1183 of 1.5 $g/cm^3$ to 2.2 $g/cm^3$.

The floor may preferably be composed of floor modules that are joined to one another. Joins in which the individual floor modules interconnect according to the "tongue and groove" principle or like "puzzle pieces" prove to be particularly advantageous. Adhesive bonding or clamping is also possible. In the aforementioned embodiments of joining the floor modules, it is preferable to additionally attach a reinforcement, for example in the form of struts and bracings, at the joining sites.

These struts and bracings, which are preferably attached to the floor perpendicularly, reinforce the battery housing floor, wherein these struts and bracings can simultaneously act as dividing walls for the individual battery modules. When producing the floor by pultrusion, some of these struts and bracings may be produced simultaneously with the housing floor.

It is particularly preferable when the housing base also has a cover made of metal or other non-combustible materials on the side facing away from the battery modules. The cover and the floor of the battery housing according to the invention are joined to one another using joining parts.

These joining parts are preferably realizable via profiles and/or side parts preferably made of metal. The joining parts may also be made of plastic, ceramic or fiber-reinforced plastic. For reasons of weight saving, these profiles/side parts may have recesses. The profiles/side parts can have any desired shape/configuration.

It is particularly preferable to employ metal profiles, since these provide in particular the option of integrating joining elements such as for example screws, rivets, adhesive bond points and weld points. Double-walled joining parts particularly preferably have one or more cavities which deform in the event of an impact. Especially joining parts made of steel have a high flexural strength. Joining parts made of steel are therefore well suited to distribute the locally concentrated incident energy in the event of a collision over a large area and to take full advantage of the mechanical properties of the floor. The joining parts should furthermore consist of as few individual parts as possible.

Especially the joining parts made of metal additionally stabilize the battery housing and can easily be joined to the vehicle floor, for example. The joining parts additionally protect the battery modules from moisture and shield them from environmental influences. Nothing can escape in the event of a leak. Impact energy is additionally absorbed by plastic deformation.

The construction of the battery housing according to the invention from a floor, cover and joining parts, wherein these may consist of different materials, has the result that joining techniques are required to join the individual parts for normal operation and for the event of an impact with one another. It is important to ensure that the joins are simple and easily accessible and that they are in some cases redetachable. It is also advantageous if the joining elements can also absorb dynamic loads. When combining different materials, the different coefficients of thermal expansion must be taken into account.

Different joining techniques may preferably be used for the battery housing according to the invention:
- Screwing together of the battery modules and the pultruded base
- Screwing together of the struts/bracings and the pultruded base
- Adhesive bonding of the pultruded floor modules to one another
- Screwing together of the struts/bracings and the joining parts (side parts)
- Adhesive bonding of the pultruded floor to the joining parts (side parts)

The particular advantage of using plastic, in particular polyurethane, reinforced with endless fibers as the matrix material for the pultruded floor/the pultruded floor modules is that screws can be screwed into the unidirectionally reinforced floor without any need for pre-drilling. Another, more brittle, matrix material, for example unsaturated polyester, could result in splintering of the floor. The pultruded floor according to the invention based on preferably employed polyurethane is thus particularly suitable for joining by screwing together, since pre-drilling can be omitted. This also simplifies the construction of the battery box, ensures detachable joins and results in fewer pretreatment/installation steps.

The battery housing according to the invention particularly preferably comprises a floor obtained by pultrusion and made of polyurethane-based thermosetting plastic obtainable from a reactive resin mixture and reinforced with endless fibers, and joining parts made of metal profiles.

In the context of the present invention, "endless fibers" are to be understood as meaning fibers known to those skilled in the art, for example inorganic fibers, organic fibers, metallic fibers, natural fibers, preferably glass fibers and carbon fibers, particularly preferably glass fibers. The term endless fiber is to be understood as meaning a fiber material having a length of at least several meters. These are unwound for example from rolls or spools. Individual fibers, so-called fiber rovings, and braided fibers may be used as the fiber material. Fiber mats, fiber noncrimp fabrics and fiber woven fabrics are less preferred since altogether lower fiber contents are achieved in the profile than when using fiber rovings. In a preferred embodiment of the invention, the glass fibers are employed in the form of fiber rovings.

Preferably employed thermosetting plastics for the pultruded base (matrix material for the battery base) are pultrudates composed of 40-80, preferably 50-75, vol %, of endless fibers and the remainder thermosetting plastic. The matrix (without endless fibers), based on polyurethane for example, preferably has a density of >1.05 g/cm$^3$.

The preferably employed polyurethane is particularly preferably obtained from a reactive mixture composed of
- a polyisocyanate component (A),
- a polyol component (B) consisting of
  - b1) a mixture of at least two polyols,
  - b2) 0-20% by weight, based on the total weight of (B), of one or more further isocyanate-reactive compounds distinct from b1),
  in the presence of
  - b3) 0-5% by weight, based on the total weight of B), of one or more catalysts,
  - b4) 0-20% by weight, based on the total weight of (B), of further assistant and/or additive substances, and
- 0.1-8% by weight, based on the total weight of (B), of at least one internal release agent (C).

The polyisocyanate component (A) is particularly preferably composed of monomeric MDI, oligomeric MDI, polymeric MDI or mixtures thereof.

The number-average hydroxyl number of the sum of the components in (B) is particularly preferably ≥400 mg KOH/g and ≤2000 mg KOH/g and the sum of the nominal OH functionalities in (B) has a number-average value between 2.5 and 3.5 and the ratio of the number of NCO groups in (A) to the sum of the number of OH groups in (B) and (C) multiplied by 100 (the so-called index) preferably has a value of 90-120.

The NCO content of the polyisocyanate component (A) is by preference more than 25% by weight, preferably more than 30% by weight, particularly preferably more than 31.5% by weight. The polyisocyanate component (A) preferably has a functionality of 2.1 to 2.9. The viscosity of the polyisocyanate component (A) is preferably ≤500 mPas (at 25° C.) measured according to DIN 53019-1.

Additionally employable are the customary aliphatic, cycloaliphatic, araliphatic di- and/or polyisocyanates and in particular aromatic isocyanates known from polyurethane chemistry. Examples of such suitable polyisocyanates are ethylene diisocyanate, 1,4-butylene diisocyanate, 1,5-pentane diisocyanate, 1,6-hexamethylene diisocyanate (HDI), 1,12-dodecane diisocyanate, cyclobutane-1,3-diisocyanate, cyclohexane-1,3- and -1,4-diisocyanate and mixtures of these isomers, isophorone diisocyanate (IPDI), 2,4- and 2,6-hexahydrotolylene diisocyanate and mixtures of these isomers, 2,2,4- and/or 2,4,4-trimethylhexamethylene diisocyanate, bis(4,4'-, 2,4'- and 2,2'-isocyanatocyclohexyl)methane or mixtures of these isomers and aromatic isocyanates of general formula R(NCO)z, wherein R is a polyvalent organic radical comprising an aromatic and z is an integer of at least 2. Examples thereof are 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitrobenzene, 2,5-diisocyanato-1-nitrobenzene, m-phenylene diisocyanate, p-phenylene diisocyanate, 2,4-tolylene diisocyanate, 2,6-tolylene diisocyanate, mixtures of 2,4- and 2,6-tolylene diisocyanate, 1,5-naphthalene diisocyanate, 1-methoxy-2,4-phenylene diisocyanate, 4,4'-biphenylene diisocyanate, 3,3'-dimethyl-4,4'-diphenylmethane diisocyanate, and 3,3'-dimethyldiphenylmethane-4,4'-diisocyanate; triisocyanates, such as 4,4',4"-triphenylmethane triisocyanate and 2,4,6-toluene triisocyanate, and tetraisocyanates such as 4,4'-dimethyl-2,2'-5,5'-diphenylmethane tetraisocyanate and 1,3- and/or 1,4-bis(2-isocyanatoprop-2-yl)benzene (TMXDI), 1,3-bis(isocyanatomethyl)benzene (XDI).

Also employable in addition to the abovementioned isocyanates are modified isocyanates, for example those having a uretdione, isocyanurate, carbodiimide, uretonimine, allophanate or biuret structure.

Employable as the mixture (b1) of at least two polyols are polyether polyols, polyester polyols, polyether ester polyols and/or polycarbonate polyols. Preferably employed in the mixture (b1) are polyether polyols and/or polyester polyols, particularly preferably polyether polyols.

In addition to the OH function, the polyols employed as b1) may also contain other isocyanate-reactive hydrogen atoms (=active hydrogen atoms), for example NH groups and NH$_2$ groups. To the extent that such further active hydrogen atoms are present, preferably more than 90%, in particular more than 95%, particularly preferably more than 99% and very particularly preferably 100% of all isocyanate-reactive hydrogen atoms in the polyol formulation originate from OH functions.

Such polyols are described for example by Ionescu in "Chemistry and Technology of Polyols for Polyurethanes", Rapra Technology Limited, Shawbury 2005, p.31 et seq. (chapt. 3: The General Characteristics of Oligo-Polyols, p.55 et seq. (chapt. 4: Oligo-Polyols for Elastic Polyurethanes), p. 263 et seq. (chapt. 8: Polyester Polyols for Elastic Polyurethanes) and in particular on p. 321 et seq. (chapt. 13: Polyether Polyols for Rigid Polyurethane Foams) and p. 419 et seq. (chapt. 16: Polyester Polyols for Rigid Polyurethane Foams).

Preferably employed as mixture b1) are two or more polyether polyols producible in a manner known per se by polyaddition of alkylene oxides such as propylene oxide and/or ethylene oxide onto polyfunctional starter compounds in the presence of catalysts. The polyhydroxyl polyethers are preferably produced from a starter compound having on average 2 to 8 active hydrogen atoms and one or more alkylene oxides, for example ethylene oxide, butylene oxide and/or propylene oxide. Preferred starter compounds are molecules having two to eight hydroxyl groups per molecule, such as water, ethylene glycol, propylene glycol, diethylene glycol, dipropylene glycol, triethylene glycol, tripropylene glycol, 1,4-butanediol, 1,6-hexanediol, bisphenol A, glycerol, trimethylolpropane, pentaerythritol, sorbitol and sucrose and aminic starter compounds such as ethylenediamine and triethanolamine, for example. The starter compounds may be used alone or in admixture. Particular preference is given to 1,2- and 1,3-propylene glycol, diethylene glycol, sorbitol, glycerol, trimethylolpropane, sucrose and mixtures of the recited products. Representatives of the recited component b1) are described for example in Kunststoff-Handbuch, volume VII "Polyurethanes", 3rd edition, Carl Hanser Verlag, Munich/Vienna, 1993, pages 57-67 and pages 88-90.

The polyester polyols are polyhydroxyl compounds comprising ester groups, for example castor oil or polyhydroxyl polyesters, such as are obtainable by polycondensation of excess amounts of simple polyhydric alcohols of the type recited hereinabove by way of example with preferably dibasic carboxylic acids or their anhydrides, for example adipic acid, phthalic acid or phthalic anhydride.

The preferably employed polyurethane system may contain 0-20% by weight, based on the total weight of (B), of further isocyanate-reactive components b2), which are distinct from the mixture b1). These are known per se as components for polyurethane. Examples include polyhydric alcohols and (oxy)alkylene diols, for example ethylene glycol and oligomers thereof, propylene glycol and oligomers thereof, 1,6-hexanediol, glycerol or trimethylolpropane and further OH-functional compounds such as for example sorbitol or bis(2-hydroxyethyleneoxy)benzene.

Employable as catalyst component (b3) are for example the known polyurethane catalysts, for example organic metal compounds, such as potassium or sodium salts of organic carboxylic acids, for example potassium acetate; likewise tin(II) salts of organic carboxylic acids, for example tin(II) acetate, tin(II) octoate, tin(II) ethylhexanoate and tin(II) laurate, and the dialkyltin(IV) salts of organic carboxylic acids, e.g. dibutyltin diacetate, dibutyltin dilaurate, dimethyltin dilaurate, dibutyltin maleate and dioctyltin diacetate, and also, for example, diisooctyl-2,2'-[(dioctylstannylene)bis(thio)] diacetate, di-n-butyl-bis(dodecylthio)tin, 2-ethylhexyl-4,4'-dibutyl-10-ethyl-7-oxo-8-oxa-3,5-dithia-4-stanna tetradecanoate, dimethyltin dithioglycolate and/or strongly basic amines such as 2,2,2-diazabicyclooctane, N,N-dimethylaminopropylamine, N,N-bis(3-dimethylaminopropyl)-N-isopropanolamine, triethylamine, triethylenediamine, tetramethylhexamethylenediamine, pentamethyldiethylenetriamine, N,N-dimethylcyclohexylamine or bis(N,N-dimethylaminoethyl)ether, N,N-dimethylbenzylamine, N,N-methyldibenzylamine and N-methylimidazole, and latent catalysts. Latent catalysts and their mechanism of action are described for example in EP 2531538 A1, pages 1-4 and page 9, line 26 to page 10, line 2. Typical latent catalysts are blocked amine and amidine catalysts, for example catalysts from Air Products (for example Polycat® SA-1/10, Dabco KTM 60) and Tosoh Corporation (such as for instance Toyocat® DB 2, DB 30, DB 31, DB 40, DB 41, DB 42, DB 60, DB 70). Further representatives of catalysts and details concerning the mode of action of the catalysts are described in Kunststoff-Handbuch, volume VII "Polyurethane", 3rd edition, Carl Hanser Verlag, Munich/Vienna, 1993 on pages 104-110.

Suitable assistant and additive substances b4) include all assistant and additive substances known for the production of polyurethanes. Such substances are known and described for example in "Kunststoffhandbuch, volume 7, Polyurethane", Carl Hanser Verlag, 3rd edition 1993, chapter 3.4.4 and 3.4.6 to 3.4.11. Examples include for example surface-active substances, defoamers, emulsifiers, viscosity reducers, dyes, pigments, flame retardants, water binders, for example tris(chloroethyl) orthoformate, alkaline earth metal oxides, zeolites, aluminum oxides, oxazolidines and silicates and adhesion promoters and fillers, such as calcium carbonate, barium sulfate, titanium dioxide, polyethylene, short fibers, for example made of glass or carbon or natural minerals, for example talc, wollastonite or muscovite.

Employable internal release agents (C) include all release agents customary in the production of polyurethanes, for example long-chain monocarboxylic acids, in particular fatty acids such as stearic acid, amines of long-chain carboxylic acids such as stearamide, fatty acid esters, metal salts of long-chain fatty acids such as zinc stearate or silicones. Particularly suitable are the internal release agents obtainable specifically for pultrusion, for example MOLD WIZ INT-1948 MCH, MOLD WIZ-1960 MCH, obtainable from Axel Plastics or Luvotrent TL HB 550-D, Luvotrent TL HB 550, obtainable from Lehmann&Voss. The internal release agents are preferably insoluble in (B). The internal release agents are employed in amounts of 0.1-8% by weight, preferably 0.1-6% by weight and particularly preferably 0.1-4% by weight, based on the total weight of (B).

The present invention further provides electric vehicles comprising the battery housing according to the invention which are characterized in that the battery housing is attached in the vehicle in such a way that the endless fibers present in the floor of the housing are aligned transversely to the direction of travel of the electric vehicle (i.e. approximately at a 90° angle to the direction of travel).

DESCRIPTION OF THE FIGURES

FIG. 1 shows part of a battery housing according to the invention without battery modules and control unit.

Figure 2:
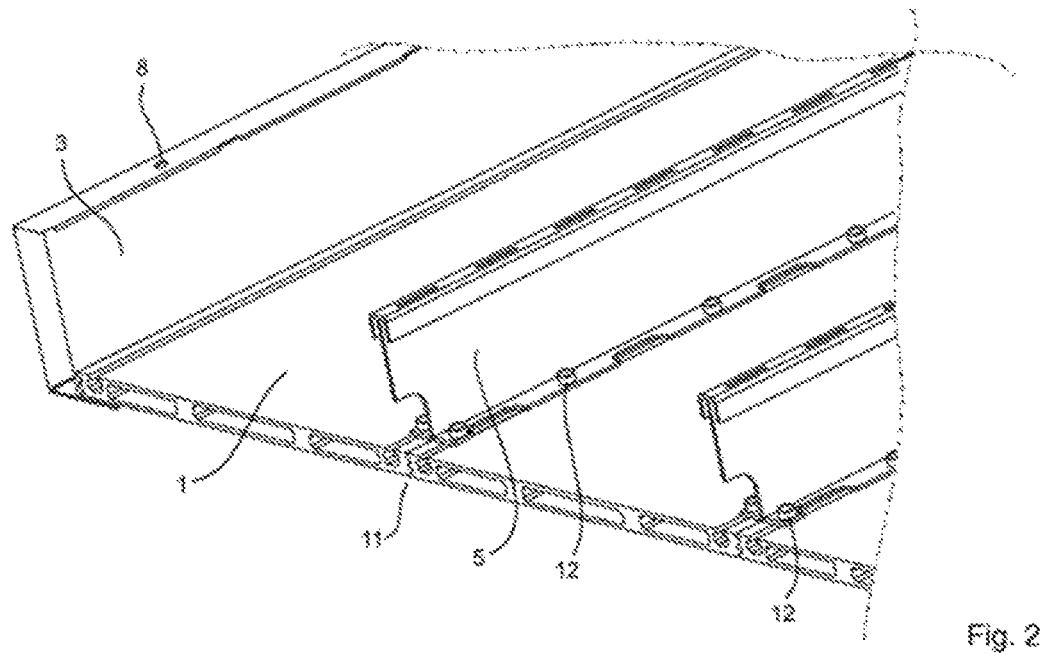
FIG. 2 shows a further possible configuration of the drying apparatus according to the invention (1000).

FIG. 2 is a detail section from FIG. 1 which is defined by the dashed circle in FIG. 1.

The battery housing has a base 1 and side walls 3 and 4 and also struts 5. The arrow 6 shows the direction of impact in the event of a side impact and the arrow 7 the direction of travel of the vehicle (not shown) in which the battery housing is located. The side parts may be joined to the cover (not shown) by means of the bores 8. Cables (not shown) may run through the recesses 9 and 9', for example. The dashed circle in FIG. 1 shows the section shown in FIG. 2.

The base modules of the battery housing are joined to one another by a tongue and groove join 11. The screws 12 connect the struts to the floor of the battery housing.

The invention shall be more particularly elucidated with reference to the exemplary embodiments which follow.

EXAMPLES

The battery housing according to the invention is composed of
- a floor made of composite, pultruded hollow chamber profiles (unidirectionally aligned glass fibers embedded in a polyurethane matrix; fiber content 65 percent by volume) whose fibers are aligned perpendicularly to the direction of travel of the vehicle; the polyurethane-based pultruded profiles have a lower density than metal and therefore have a low weight;
- side parts composed of hollow chamber profiles made of steel;
- struts made of steel which connect two adjacent floor profiles and two opposite side parts;
- a lid composed of a polypropylene plate which seals the battery housing;
- battery modules and control unit.

The employed polyurethane system was:

| Polyol component B: | [% by weight] |
|---|---|
| Glycerol-started triol, propoxylated, OHN = 235 mg KOH/g | 28.47 |
| Glycerol-started triol, propoxylated, OHN = 1050 mg KOH/g | 26.00 |
| Glycerol-started triol, propoxylated, OHN = 400 mg KOH/g | 23.81 |
| Propylene glycol-started diol, propoxylated, OHN = 28 mg KOH/g | 9.79 |
| Propylene glycol-started diol, propoxylated, OHN = 515 mg KOH/g | 9.26 |
| Diisooctyl 2,2'-[(dioctylstannylene)bis(thio)]diacetate | 0.67 |
| MOLSIV ® L-powder from UOP | 2.00 |
| Luvotrent ® TL HB 550 from Lehmann & Voss | 4.00 |
| Average OH number of component B | 486 |
| Nominal functionality of component B | 2.73 |
| Component A: | |
| Polymeric MDI having an NCO content of 31.5% and a viscosity of 200 mPas at 25° C. (ISO 3219) | 131 |

The pultruded profiles produced with the polyurethane system have the following physical properties:
- Axial flexural strength: about 1300 MPa (DIN EN ISO 14125)
- Axial compression modulus: about 53.5 GPa (DIN EN ISO 14126)
- Interlaminar axial shear strength: about 70 MPa (DIN EN ISO 14130)
- Thermal conductivity: about 0.5 W/m K (DIN EN 993-14)
- Density: about 2.1 g/cm$^3$ (DIN EN ISO 1183)
- Transverse tensile modulus: about 12 GPa (DIN EN ISO 527-4)
- Axial tensile modulus: about 50 GPa (DIN EN ISO 527-4)
- Shear modulus: about 3.5 GPa (DIN EN ISO 15310)

The comparative battery housing consists of a profiled floor plate ("corrugated profile" for stiffening) made of die-cast aluminum, upon which the battery modules are secured. The battery modules are covered by a lid made of glass fiber-reinforced polypropylene. The floor plate projects laterally and thus has a greater area than the battery modules secured thereupon and therefore constitutes a lateral crumple zone which is intended to absorb the forces in the event of an impact through deformation.

The battery housing according to the invention was subjected to two different simulated crash cases (the so-called "China crush test" and "side pole impact test (35 km/h))(90°" corresponding to the NCAP tests for crash load cases) and compared with the comparative battery housing described above from the prior art.

In the so-called China crush test, the battery housing including the battery modules and the control unit is pressed (laterally and centrally) against a pole having a diameter of 150 mm at a speed of 1 m/s and the resulting deformation is observed. Battery modules should not be damaged upon achieving a force of 120 kN.

The simulation of the China crush test with the battery housing according to the invention showed that no damage to the battery/the battery modules occurred at 120 kN.

The simulation was repeated with a battery housing made of die-cast aluminum. The simulation showed significant damage to the battery/battery modules.

In the so-called side pole impact test, the battery housing including the battery modules and the control unit together with a frame structure constituting the chassis of the vehicle is pushed perpendicularly and centrally against a pole at 35 km/h. The total weight was 1750 kg. The simulation was repeated with a reduced stiffness of the frame structure ("vehicle chassis"). The battery modules/battery should not be damaged in the pole impact simulation. In the first simulation, an impact energy of 15 960 J acts on the battery housing and in the second simulation an impact energy of 25 309 J.

The simulation of the pole impact test with the battery housing according to the invention showed that both an impact energy of 15 960 J and an impact energy of 25 309 J were able to be absorbed by the battery housing according to the invention without the battery/battery modules being damaged.

In the simulation with the above-described comparative housing, severe damage to the battery/battery modules was observed even at an impact energy of 15 960 J.

At 310.3 kg, the battery housing according to the invention was only slightly heavier than the comparative housing at 291.1 kg.

The floor made of glass fiber-reinforced polyurethane has a low thermal conductivity of 0.5 W/(m*K) according to DIN EN 993-14 and the battery modules can therefore be operated in an energy-efficient manner in the preferred temperature range.

The invention claimed is:

1. A battery housing for an electric vehicle, wherein the housing comprises a cover and a floor which are joined to one another and the cover is joined to a vehicle body or a part of the vehicle body forms the cover of the housing, wherein the floor faces away from the vehicle body and the floor is obtained by pultrusion and is made of thermosetting plastic obtained from a reactive resin mixture and reinforced with endless fibers, wherein the fibers run transversely to the direction of travel of the vehicle.

2. The battery housing as claimed in claim 1, wherein the plastic comprises polyurethane.

3. The battery housing as claimed in claim 2, wherein the pultruded floor made of polyurethane as the plastic and reinforced with glass-based endless fibers has an axial flexural strength according to DIN EN ISO 14125 of 1100 to 1500 MPa, an axial compression modulus according to DIN EN ISO 14126 of 50 to 60 GPa, an axial interlaminar shear strength according to DIN EN ISO 14130 of 60 to 80

MPa, a shear modulus according to DIN EN ISO 15310 of 3 to 6 GPa, an axial tensile modulus according to DIN EN ISO 527-4 of 45 to 60 GPa, a transverse tensile modulus according to DIN EN ISO 527-4 of 10 to 15 GPa and/or a thermal conductivity according to DIN EN 993-14 of 0.1 to 0.7 W/m K.

4. The battery housing as claimed in claim 2, wherein the polyurethane reinforced with endless fibers has a density according to DIN EN ISO 1183 of 1.5 g/cm³ to 2.2 g/cm³.

5. The battery housing as claimed in claim 2, wherein the content of endless fibers is at least 40% by volume and at most 80% by volume in the polyurethane reinforced with endless fibers.

6. The battery housing as claimed in claim 2, wherein the polyurethane is obtained from a polyurethane reaction mixture consisting of
 a polyisocyanate component (A),
 a polyol component (B) consisting of
 b1) a mixture of at least two polyols,
 b2) 0-20% by weight, based on the total weight of (B), of one or more further isocyanate-reactive compounds distinct from b1),
 in the presence of
 b3) 0-5% by weight, based on the total weight of B), of one or more catalysts,
 b4) 0-20% by weight, based on the total weight of (B), of further assistant and/or additive substances, and
 0.1-8% by weight, based on the total weight of (B), of at least one internal release agent (C).

7. The battery housing as claimed in claim 1, wherein the floor has hollow chambers.

8. The battery housing as claimed in claim 1, wherein the cover and the floor are joined by profiles and/or side parts made of metal.

9. The battery housing as claimed in claim 1, wherein the floor comprises floor modules that are joined to one another and have joining sites.

10. The battery housing as claimed in claim 9, wherein the floor modules are additionally reinforced at the joining sites.

11. The battery housing as claimed in claim 1, wherein the floor is reinforced by struts and/or bracings arranged perpendicular to the floor.

12. An electric vehicle comprising a battery housing as claimed in claim 1, wherein the battery housing is attached in the vehicle in such a way that the endless fibers present in the floor of the housing are aligned transversely to the direction of travel of the electric vehicle.

* * * * *